US012801789B2

(12) United States Patent
Tran et al.

(10) Patent No.: US 12,801,789 B2
(45) Date of Patent: Nov. 17, 2026

(54) SYSTEM AND METHOD FOR USING ARTIFICIAL INTELLIGENCE TO DETERMINE IF AN ACTION IS AUTHORIZED

(71) Applicant: Bank of America Corporation, Charlotte, NC (US)

(72) Inventors: Ngoc Tran, Charlotte, NC (US); Maneesh Kumar Sethia, Hyderabad (IN); Saurabh Garg, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 222 days.

(21) Appl. No.: 18/455,849

(22) Filed: Aug. 25, 2023

(65) Prior Publication Data

US 2025/0068772 A1 Feb. 27, 2025

(51) Int. Cl.
*G06F 21/62* (2013.01)

(52) U.S. Cl.
CPC .................................. *G06F 21/629* (2013.01)

(58) Field of Classification Search
CPC ..................................................... G06F 21/629
USPC ............................................................ 726/29
See application file for complete search history.

(56) References Cited

U.S. PATENT DOCUMENTS 7,757,943 B2 7/2010 D'Angelo et al.
7,809,650 B2 10/2010 Bruesewitz et al.
8,620,798 B2 12/2013 Faith et al.
8,885,894 B2 11/2014 Rowen et al.
9,268,990 B2 2/2016 Trugenberger
10,410,309 B2 9/2019 Rodriguez et al.
10,460,397 B2 10/2019 Cowen et al.
11,120,111 B2 9/2021 Storm et al.
(Continued)

FOREIGN PATENT DOCUMENTS

CN 109308494 A * 2/2019 ......... G06F 18/2415
WO WO-2023278956 A1 * 1/2023 ........... G06F 18/214

OTHER PUBLICATIONS

Ryutov et al., "Integrated access control and intrusion detection for Web servers," in IEEE Transactions on Parallel and Distributed Systems, vol. 14, No. 9, pp. 841-850, Sep. 2003, doi: 10.1109/TPDS.2003.1233707. (Year: 2003).*
(Continued)

*Primary Examiner* — Peter C Shaw

(57) ABSTRACT

A system that includes a memory and a processor that determines whether to authorize an action. The processor receives a plurality of authorization messages that are requests for authorizing actions. The processor then extracts data from the plurality of authorization messages and analyzes the data with a trained neural network to group the plurality of authorization messages. The resulting plurality of message groupings are then analyzed by a long-short-term-memory algorithm (LSTM) to determine a plurality of patterns that indicate that a particular authorization message may be authorized. The processor then receives one or more new authorization messages from an external device and compares these to the plurality of patterns. If the one or more new authorization messages correspond to any of the patterns, then the external device is notified by the processor that it should deny the action associated with the new authorization messages.

20 Claims, 2 Drawing Sheets

(56) References Cited

U.S. PATENT DOCUMENTS

| | | | | |
|---|---|---|---|---|
| 11,636,489 | B2 * | 4/2023 | Bharghavan | G06Q 20/4015 705/44 |
| 11,902,269 | B1 * | 2/2024 | Sharma | H04L 41/16 |
| 11,971,862 | B1 * | 4/2024 | Han | G06Q 20/401 |
| 2018/0068395 | A1 | 3/2018 | Gupta et al. | |
| 2018/0300171 | A1 * | 10/2018 | Qiao | G06F 9/5088 |
| 2018/0374152 | A1 | 12/2018 | Dominguez | |
| 2019/0130312 | A1 | 5/2019 | Xiong et al. | |
| 2019/0213498 | A1 | 7/2019 | Adjaoute | |
| 2019/0251380 | A1 * | 8/2019 | Park | G06V 10/803 |
| 2019/0258818 | A1 * | 8/2019 | Yu | G06N 20/00 |
| 2019/0347559 | A1 | 11/2019 | Kang et al. | |
| 2019/0378136 | A1 * | 12/2019 | Efraim | G06Q 20/4093 |
| 2019/0385170 | A1 | 12/2019 | Arrabothu et al. | |
| 2019/0391796 | A1 * | 12/2019 | Brady | G06F 8/458 |
| 2020/0327225 | A1 | 10/2020 | Nguyen et al. | |
| 2020/0364596 | A1 * | 11/2020 | Zang | G06F 18/217 |
| 2022/0188598 | A1 * | 6/2022 | Gu | G06N 3/045 |
| 2022/0207630 | A1 * | 6/2022 | Cohen | H04L 9/088 |
| 2023/0020504 | A1 * | 1/2023 | Moon | G06N 20/00 |
| 2023/0036917 | A1 * | 2/2023 | Meschiari | G06N 20/00 |
| 2023/0120865 | A1 * | 4/2023 | Nascimento | G06Q 20/4016 705/44 |
| 2023/0205499 | A1 * | 6/2023 | Wu | G06F 15/7867 717/154 |
| 2024/0031146 | A1 * | 1/2024 | Marosi-Bauer | H04L 9/088 |
| 2024/0320471 | A1 * | 9/2024 | Chen | G06F 21/31 |

OTHER PUBLICATIONS

Ohno et al., "Anomaly Detection System Using Resource Pattern Learning," 2009 Software Technologies for Future Dependable Distributed Systems, Tokyo, Japan, 2009, pp. 38-42, doi: 10.1109/STFSSD.2009.41. (Year: 2009).*

Nascimento et al., "Anomaly-based intrusion detection in software as a service," 2011 IEEE/IFIP 41st International Conference on Dependable Systems and Networks Workshops (DSN-W), Hong Kong, China, 2011, pp. 19-24, doi: 10.1109/DSNW.2011.5958858. (Year: 2011).*

Valdes et al., "Communication pattern anomaly detection in process control systems," 2009 IEEE Conference on Technologies for Homeland Security, Waltham, MA, USA, 2009, pp. 22-29, doi: 10.1109/THS.2009.5168010. (Year: 2009).*

Akbarian et al., "Autoencoder-LSTM Algorithm for Anomaly Detection," 2023 IEEE 20th International Conference on Smart Communities: Improving Quality of Life using AI, Robotics and IoT (HONET), Boca Raton, FL, USA, 2023, pp. 1-6, doi: 10.1109/HONET59747.2023.10374710. (Year: 2023).*

Gao et al., "Research and application of pattern recognition LSTM based bridge data anomaly detection," 2022 China Automation Congress (CAC), Xiamen, China, 2022, pp. 4630-4635, doi: 10.1109/CAC57257.2022.10054767. (Year: 2022).*

Padthe et al., "Recursive Feature Elimination with Adaptive Encryption Pattern Recognition for Real-Time Anomaly Detection," 2025 3rd International Conference on Data Science and Information System (ICDSIS), Hassan, India, 2025, pp. 1-5, doi: 10.1109/ICDSIS65355.2025.11070455. (Year: 2025).*

Du et al., "Deep Learning Based APT Attack Recognition," 2024 IEEE 17th International Conference on Signal Processing (ICSP), Suzhou, China, 2024, pp. 147-155, doi: 10.1109/ICSP62129.2024.10846302. (Year: 2024).*

Liu et al., "Recognition of Access Control Role Based on Convolutional Neural Network," 2018 IEEE 4th International Conference on Computer and Communications (ICCC), Chengdu, China, 2018, pp. 2069-2074, doi: 10.1109/CompComm.2018.8780610. (Year: 2018).*

Abroyan, "Convolutional and recurrent neural networks for real-time data classification," 2017 Seventh International Conference on Innovative Computing Technology (INTECH), Luton, UK, 2017, pp. 42-45, doi: 10.1109/INTECH.2017.8102422. (Year: 2017).*

Wu et al., "Spiking-Timing-Dependent Plasticity Convolutional Spiking Neural Network for Efficient Radar-Based Gesture Recognition," 2023 (ICICML), Chengdu, China, 2023, pp. 617-620, doi: 10.1109/ICICML60161.2023.10424838. (Year: 2023).*

Hewamadduma, "Detection and prevention of possible unauthorized login attempts through stolen credentials from a phishing attack in an online banking system," 2017 (ICRIIS), Langkawi, Malaysia, 2017, pp. 1-6, doi: 10.1109/ICRIIS.2017.8002440. (Year: 2017).*

Kacheru, "Governance of AI-Enabled Behavioral Biometrics in Mobile Banking: Ensuring Security and Trust," 2025 (ICRTEECT), Warangal, India, 2025, pp. 1-6, doi: 10.1109/ICRTEECT67512.2025.11448951. (Year: 2025).*

Bignell, "Authentication in an Internet Banking Environment; Towards Developing a Strategy for Fraud Detection," International Conference on Internet Surveillance and Protection (ICISP'06), Cote d'Azur, France, 2006, pp. 23-23, doi: 10.1109/ICISP.2006.3. (Year: 2006).*

Reddy et al., "AI-based Behavioral Biometrics for Enhanced Authentication in Mobile Banking," 2025 (ICoICI), Coimbatore, India, 2025, pp. 595-599, doi: 10.1109/ICoICI65217.2025.11254900. (Year: 2025).*

* cited by examiner

SYSTEM AND METHOD FOR USING ARTIFICIAL INTELLIGENCE TO DETERMINE IF AN ACTION IS AUTHORIZED

TECHNICAL FIELD

The present disclosure relates generally to computational systems, and more specifically to a system and method for using artificial intelligence to determine if an action is authorized.

BACKGROUND

Existing computer systems for performing authorizations of actions are inefficient and may fail to detect instances of actions that should not be authorized. Many actions need to be authorized either due to the resources used by the action, or due to the sensitivity of the action. However, due to these features some actions should not be authorized when they are initiated due to malicious intent or simply human or machine error. Frequently, indications that a particular action should not be authorized may be missed either due to time constraints or due to the sheer amount of data that must be processed. Further, those with malicious intent attempting to have actions that should not be authorized, frequently improve, or evolve their techniques to evade detection. The existing approaches to address these evolving techniques often result in too many false positives and/or require additional human intervention, which further delays the authorization of actions or results in actions that should not be authorized being authorized.

SUMMARY

The system disclosed in the present application provides a technical solution to the technical problems discussed above by providing the capability to use machine learning algorithms to analyze actions and determine patterns associated with actions that should not be authorized. These patterns may then be used to provide an automated system to determine, when new actions are initiated, if these actions should be authorized or denied. This new use of the disclosed machine learning algorithms allows for decisions on whether to authorize actions to be made automatically without human intervention or with limited human intervention. Further these algorithms have the ability to evolve and change, making it more difficult for nefarious actors to obtain authorization for actions that are fraudulent in nature.

The disclosed system provides several practical applications which include: (a) a process for analyzing current and historic requests for authorization of actions to make and determine patterns of activity that indicate that the requests should not be authorized; (b) modifying the patterns as new criteria and/or patterns emerge that indicate the requests should not be authorized; and (c) automatically process new requests for authorization of actions using the determined patterns, to make authorization more automatic and better at differentiating from those requests that are authentic and those that are fraudulent and/or otherwise should not be authorized. This approach provides better resource utilization and a higher throughput compared to existing approaches while still being able to mitigate or eliminate actions that should not be authorized.

In one embodiment, the disclosed system includes a memory that stores instructions and data related to authorizing an action and a processor coupled to the memory. The processor is configured to receive a plurality of authorization messages. The authorization messages are a request for authorizing one or more different actions such as, but not limited to, point of sale (POS) transactions, card authorization, accessing on-line resources, purchasing or receiving a product, or any other action that may require authorization. The processor then extracts predetermined data from the plurality of authorization messages, including data that at least identifies the one or more different actions. The processor then applies a trained neural network to the extracted predetermined data which groups the plurality of authorization messages based on determined common features to produce a plurality of message groupings. A long-short-term-memory algorithm (LSTM) is then applied to the message groupings to determine a plurality of patterns that indicate that a particular authorization message meets a predetermined criteria indicating that the authorization message should not be authorized. The predetermined criteria may be that the authorization message has a probability that is greater than a threshold amount that the actions associated with the authorization messages should not be authorized. At some later time, one or more new authorization messages are received from an external device, these new authorization messages are compared to the plurality of patterns by the processor, and if the processor determines that one or more of the new authorization messages correspond to one of the patterns, then the external device is notified to deny the action associated with the one or more new authorization messages.

These patterns indicate that an authorization message with the particular extracted data has a probability that it is associated with an unauthorized action that is greater than a threshold percentage as determined by the LSTM algorithm. The new authorization messages are further evaluated by a multi-dependency data processing scheduling (MDDPS) algorithm to determine the order that the one or more new authorization messages is compared to the patterns. Once a new authorization message is compared to the patterns that are generated and updated by the LSTM algorithm as well as the trained neural network, a determination is made to determine if the new authorization messages correspond to one or more of the patterns. If the new authorization message corresponds to one or more of the patterns, then a notification is sent to indicate that the action is not authorized. Other parties such as a user and/or law enforcement may also be notified that an action has been initiated that is not authorized.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System for Authorizing an Action, Overview

Figure 1:
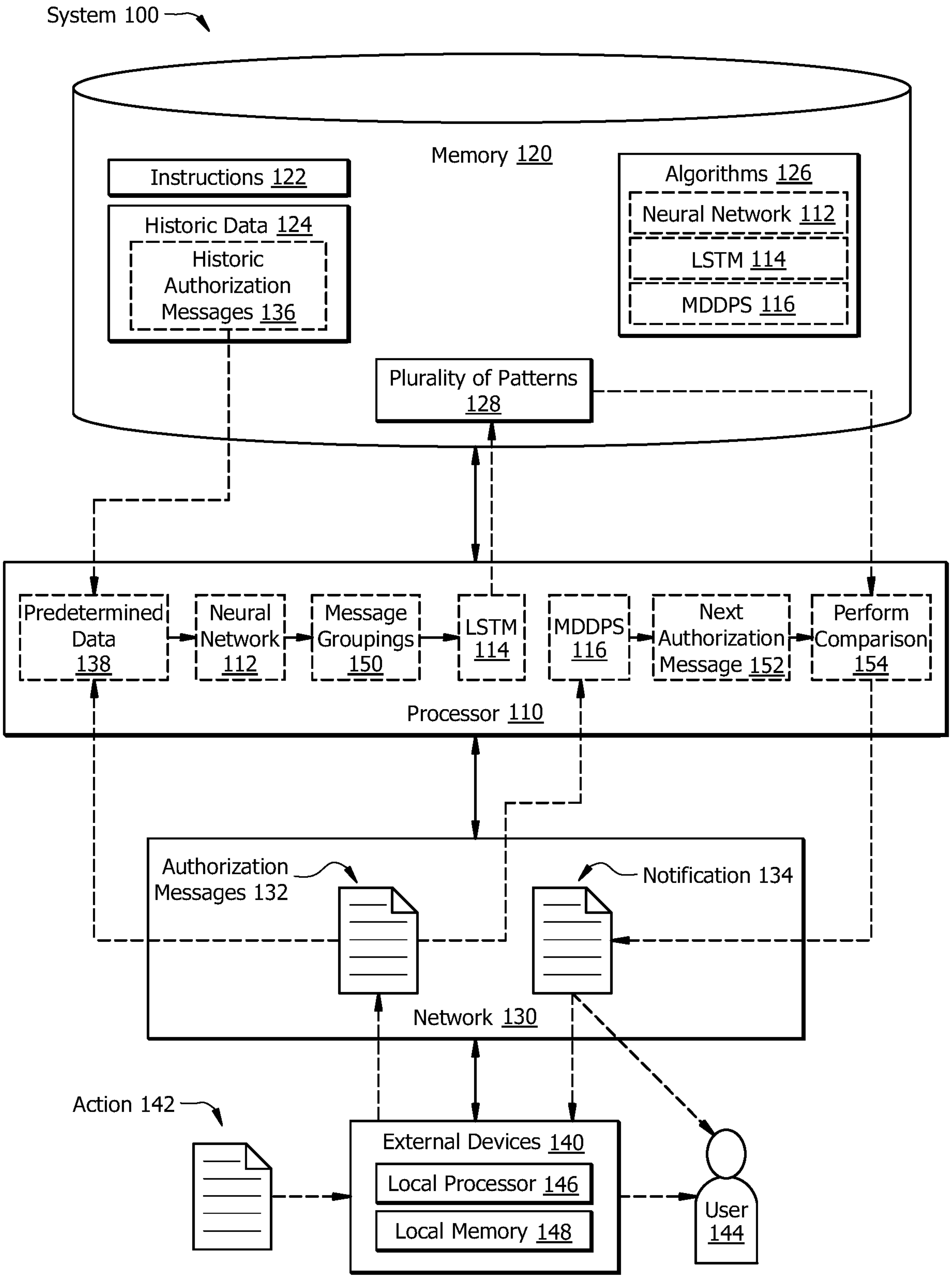
FIG. 1 illustrates one embodiment of a system configured to determine whether to authorize an action.

FIG. 1 is a schematic diagram of a system 100 configured to determine whether to authorize an action 142. More specifically, the system 100 is configured to have a user 144 or other entity request that an action 142 be performed by external devices 140. The external devices 140 when they receive a request for an action 142, send authorization messages 132 through a network 130 to a processor 110, which uses instructions 122 and algorithms 126 stored in a memory 120 to perform operations on the authorization message 132 to determine whether to authorize the action 142. Once a determination is made by the processor 110, a notification 134 is sent to the external devices 140 instructing the external devices 140 either to perform the action 142 and/or to send the notification 134 or another message to at least one appropriate user 144. The at least one user 144 may be a user 144 that requests the action 142 or an administrator, security professional, government entity, or any other entity that needs to know if an action 142 is performed or is denied. The processor 110 is further configured to update the algorithms 126 when any new authorization messages 132 are received from the external devices 140.

In one embodiment, the system 100 comprises a processor 110 and a memory 120 that are in signal communication with external devices 140 and connected through a network 130. The system 100 may be configured as shown or in any other suitable configuration.

The network 130 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 130 may be configured to support any suitable type of communication protocol as would be appreciated by one of ordinary skill in the art.

External Devices

Examples of external devices 140 include, but are not limited to, computers, laptops, mobile devices (e.g., smart phones or tablets), servers, clients, automated teller machines (ATM), point of sale devices (POS), or any other suitable type of device that may perform an action that needs to be authorized. The external devices 140 include at least one local processor 146 that performs one or more processes or operations, including but not limited to the action, sending authorization messages 132 to the processor 110, notifying a user 144 and/or receiving a request for the action 142 from a user 144. While a single external device 140 is shown, a plurality of external devices 140, users 144, and actions 142 may be present with one of each being shown in FIG. 1, for simplicity.

The external devices 140 may also include at least one local memory 148 for storing instructions 122 for performing an action as well as sending authorization messages 132 to the processor 110 and responding to notifications 134 from the processor 110. While FIG. 1 only shows the external devices 140 including a single local processor 146 and a single local memory 148, they may include any suitable number and combination of local processors 146 and local memories 148 as well as other necessary components; with only one local processor e.g., 146 and one local memory e.g., 148 for the external devices 140 being shown in FIG. 1 for simplicity.

The external devices 140 are configured to perform one or more different actions 142. The actions 142 may take any form. In general, they are actions 142 that are performed by one or more external devices 140 with minimal or no human interaction. Some exemplary actions are processing a payment, processing a credit card or debit card, ordering a product, dispensing a product, allowing access to a resource such as, but not limited to, an internet page, secure documents, and/or other resources. When a request to perform one or more different actions 142 are received from a user 144 or by another process, the local processor 146 first determines if the actions 142 needs authorization. When the actions 142 needs authorization, the local processor 146 sends authorization messages 132 through the network 130 to the processor 110. The authorization messages 132 may be related to receiving permission for the external devices 140 to perform the one or more different actions 142. After processor 110 performs various operations as will be described below and with regards to the method shown in FIG. 2, the processor 110 sends a notification 134 back to the external device 140. This notification 134 may be an indication that the external devices 140 should proceed with the actions 142 or it may be an indication that the external devices 140 should not perform the actions 142. Additionally, the notification 134 indicating the actions 142 should not be performed may be sent to a user 144 or other concerned party, such as but not limited to, a security professional, law enforcement, and/or administrator. This notification 134 then allows the appropriate responses to be taken to prevent further unauthorized actions 142.

Processor

The processor 110 receives and/or processes the authorization message 132 received from the external devices 140. The processor 110 may take the form of any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 110 may be a programmable logic device, a microcontroller, a microprocessor, or any suitable combination of the preceding. The processor 110 is communicatively coupled to and in signal communication with the memory 120. The one or more processors making up the processor 110 are configured to process data and may be implemented in hardware or software. For example, the processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions 122 from memory 120 and executes them by directing the coordinated operations of the ALU, registers and other components.

The processor 110 is in operative communication with the memory 120. The processor 110 is configured to implement various instructions 122 stored in the memory 120. The processor 110 may be a special purpose computer designed to implement the instructions 122 and/or functions disclosed herein. For example, the processor 110 may be configured to perform the operations of the methods described in FIG. 2.

Additionally, the processor 110 executes instructions 122 to perform a series of one or more operations such as those discussed below with regards to the method of FIG. 2 on the authorization message 132. The processor 110 uses the one or more algorithms 126, historic data 124, and patterns 128 stored in the memory 120 to perform various operations such as, but not limited to using a neural network algorithm 112, a long-short-term-memory (LSTM) algorithm 114, a multi dependency data processes scheduling (MDDPS) algorithm 116, and any other operations needed for processing the authentication message 132. The processor 110 may perform more or less operations than shown in FIG. 1, and the specific operations shown are only examples. While a single processor 110 is shown, the processor 110 may include a plurality of processors or computational devices. The algorithms 126 and/or other operations described herein as being performed by the processor 110 may be performed by a separate processor or software application executed on a single computational device e.g., processor 110, or they may be located on separate servers and/or even separate datacenters such as a cloud server and/or the external devices 140.

Initially the processor 110 receives a plurality of authorization messages 132 and/or historic authorization messages 136 stored in the historic data 124 in memory 120. The processor 110 analyzes the authorization messages 132 and/or historic authorization messages 136 and extracts predetermined data 138 from the authorization messages 132 and/or historic authorization messages 136. Depending on the type of action 142 to be authorized, different predetermined data 138 may be extracted from the authorization messages 132 and/or historic authorization messages 136. For example, if the action 142 is a point-of-sale transaction, the predetermined data 138 extracted from the related authorization messages 136 may be the amount, one or more account numbers or identification of the parties involved in the transaction, the geolocation information of the external device 140, IP addresses for the external device 140, and/or other information that may be useful for determining if the action 142 may be authorized. In a second example if the action 142 is dispensing a product, for example food, beverage, a drug, a consumer device, office supply, or any other product, the processor 110 would extract from the corresponding authorized message 132, predetermined data 138 such as, in a non-limiting example, a user's 144 identification, an amount of product, the amount of the purchase, the geolocation of the external device 140, and any other pertinent information.

Other predetermined data 138, related to the network 130 or the external devices 140, may also be extracted from the authorization messages 132 and/or historic authorization messages 136. This predetermined data 138 may include such things as symbol rate, channel load, loss, span count, length of the message, channel noise, channel grid, hash value of the message, protocols used, routing, and any other data that might indicate that the message has been tampered with or is or was transmitted from unauthorized external devices 140.

Once the predetermined data 138 is extracted by the processor 110 from the authorization messages 132 and/or historic authorization messages 136, the predetermined data 138 is then grouped by the processor 110 using a neural network algorithm 112 to form one or more message groupings 150 based on determined common features from the extracted predetermined data 138. The neural network algorithm 112 may take a variety of known forms such as feedforward neural network, autoencoder, probabilistic neural network (PNN), convolutional neural network (CNN), or other known neural network algorithms 112. The specific type of neural network algorithm 112 used by the processor 110 may be selected based on a variety of factors, including computational ability of the processor 110, speed of the neural network algorithm 112, availably of sufficient training data for the specific neural network algorithm 112, appropriateness to the type of authorization messages 132, and/or other criteria.

Once the processor 110 groups the messages into a plurality of message groupings 150, the processor 110 then uses a long-short-term-memory (LSTM) algorithm 114 to determine a plurality of patterns 128 and/or update the plurality of patterns 128. An LSTM algorithm 114 is a recurrent neural network, which aims to provide a short-term memory for recurrent neural networks that may last thousands of timesteps. LSTM algorithms 114 are applicable to classification, processing, and predicting data based on time series. The LSTM algorithm 114 includes an additional module in a neural network that learns when to remember and when to forget pertinent information; learning which information might be needed later in a sequence and when that information is no longer needed.

The processor 110 performing the LSTM algorithm 114, determines the plurality of patterns 128 which are stored in the memory 120. These pluralities of patterns 128 are determined from elements of predetermined data 138 that is extracted from the authorization messages 132 and/or historic authorization messages 136. The elements that make up the plurality of patterns 128 are elements that the processor 110 performing the LSTM algorithm 114 determines may indicate that a particular authorization message 132 having those elements meets the one or more predetermined criteria. The predetermined criteria being that the particular authorization messages 132 corresponds to at least one action 142 that has a probability that is greater than a threshold percentage to be an action 142 that is not or should not be authorized. For example, some of the plurality of patterns 128 that may indicate that an action 142 should not be authorized would be a plurality of transactions that are performed within a specific time period of each other, or transactions that are performed in unexpected locations, or other patterns that might indicate fraud or unauthorized attempts to perform an action 142. The predetermined probability may be determined by an administrator or other appropriate entity and/or may be set based on the type of transaction.

At some time later, after the processor 110 has produced and/or modified the plurality of patterns 128, one or more authorization messages 132 are received. These new one or more authorization messages 132 are then analyzed by a multi dependency data process scheduling (MDDPS) algorithm 116 used by the processor 110 to determine the next authorization message 152 of the plurality of authorization messages 132 to analyze. Once the next authorization message 152 is determined by the processor 110 using the MDDPS algorithm 116, the processor 110 performs a comparison operation 154 and compares the next authorization messages 152 to the plurality of patterns 128 by the processor 110. When the next authorization message 152 corresponds to one or more of the plurality of patterns 128 the processor 110 sends a notification 134 to the external devices 140 and/or user 144 to alert them that the action 142 related to the next authorization message 152 is not authorized and may not be performed. If, however, the processor 110 determines when performing the comparison operation 154, that the next authorization messages 152 does not correspond to the plurality of patterns 128, then the processor 110 will send a notification 134 to the external devices 140 and/or user 144 indicating that the action 142 related to the next authorization message 152 is authorized and may be performed. The new authorization messages 132 that are analyzed by the processor 110, may be used by the processor 110 to further train and/or refine the algorithms 126.

Memory

Memory 120 may be any type of storage for storing a computer program comprising instructions 122, historic data 124, patterns 128, and algorithms 126, such as one or more neural network algorithms 112, LSTM algorithms 114, and MDDPS algorithms 116. The memory 120 may be a non-transitory computer-readable medium that is in operative communication with the processor 110. The memory 120 may be one or more disks, tape drives, or solid-state drives. Alternatively, or in addition, the memory 120 may be one or more cloud storage devices. The memory 120 may also be used as an over-flow data storage device, to store applications when such applications are selected for execution, and to store instructions 122 and data that are read during the execution of the applications. The memory 120 may be volatile or non-volatile and may comprise read-only memory (ROM), random-access memory (RAM), ternary content-addressable memory (TCAM), dynamic random-access memory (DRAM), and static random-access memory (SRAM).

Figure 2:
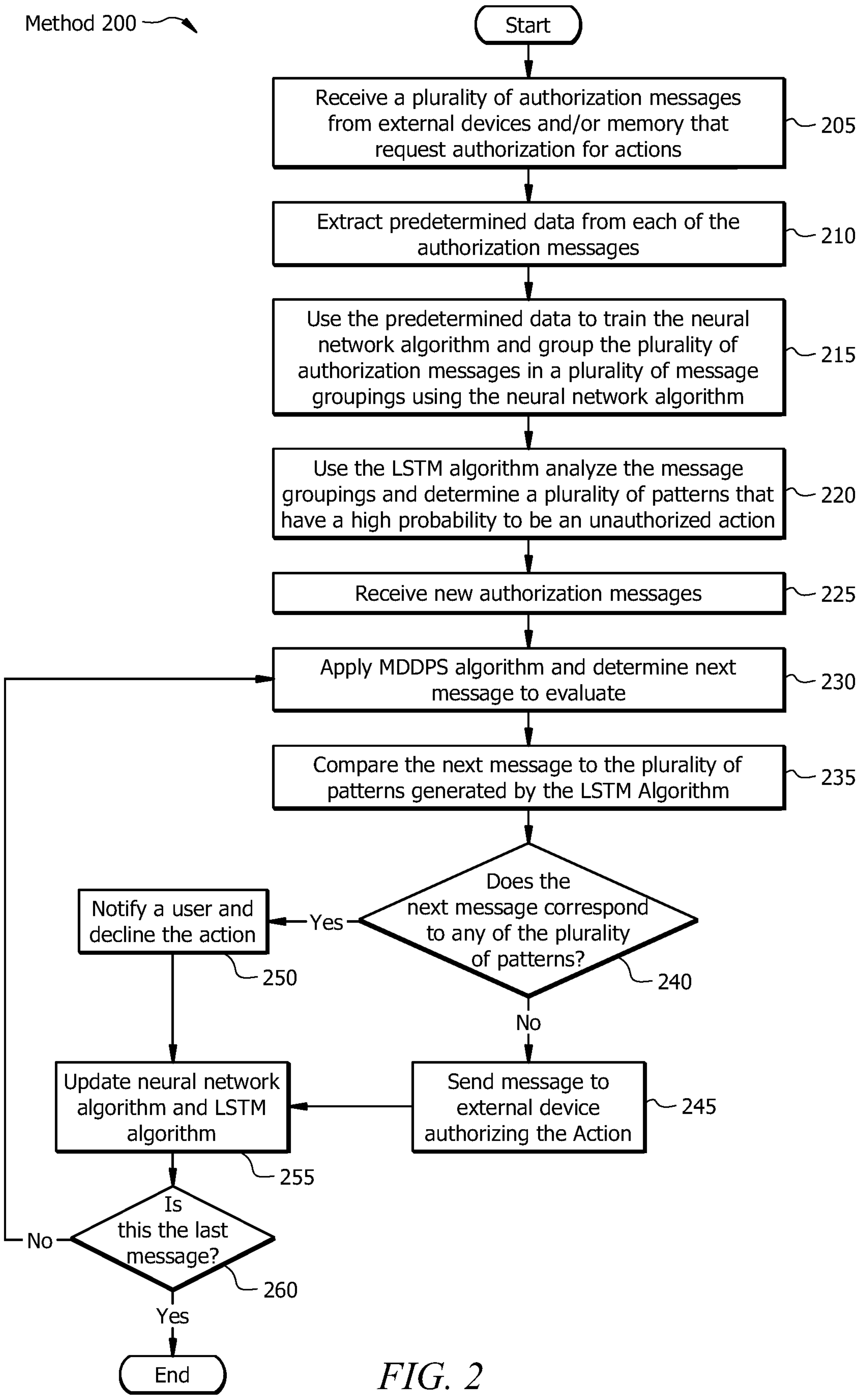
FIG. 2 illustrates one embodiment of a method of authorizing an action.

The memory 120 stores instructions 122 that when executed by the processor 110, causes the processor 110 to perform the operations that are described in FIGS. 1 and 2. The instructions 122 may comprise any suitable set of instructions, logic, rules, or code.

The memory 120 may include storage that takes the form of a database for storing historic data 124 and patterns 128. The historic data 124 may be used by the processor 110 when performing the neural network algorithms 112, LSTM algorithms 114, and MDDPS algorithms 116 to determine one or more patterns 128 which are then used by the processor 110 to determine if an authorization message 132 should be authorized. The historic data 124 and patterns 128 may be stored and recalled using known protocols such as SQL, XML, and/or any other protocol or language that a user 144, administrator, or developer of the system 100 wishes to use.

Action Authorizing Process

FIG. 2 is a flowchart of an embodiment of a method 200 for receiving a plurality of authorization messages 132 from external devices 140 and determining by the processor 110 whether to authorize the actions 142. The processor 110 may execute instructions 122 stored in the memory 120, that employ the method 200 for authorizing one or more actions 142 to be performed by the local processors 146 of the external devices 140.

At operation 205, the processor 110 receives a plurality of authorization messages 132 from external devices 140 that request authorization for actions 142. These may be current authorization messages 132 received through the network 130 from the external devices 140. Alternatively, or in addition, historic authorization messages 136 may be obtained from the historic data 124 stored in the memory 120. The authorization messages 132 and/or historic authorization messages 136 may be related to receiving permission for the external devices 140 to perform actions 142. This allows the algorithms 126 to be trained on a larger set of data then may be currently available from current or new authorization messages 132.

The plurality of authorization messages 132 may be related to one or more different actions 142 such as, but not limited to, processing a credit card or debit card for a payment, withdrawal of money, providing a product such as food, entertainment, consumer items, or other items that may be provided by external devices 140. In other non-limiting examples, the plurality of authorization messages 132 may be related to allowing actions 142 such as allowing a user 144 to use the local processor 146 of the external devices 140 to perform some operation or access a remote system through the network 130. Other actions 142 may result in authorization messages 132 be sent from the external devices 140 and received by the processor 110 at operation 205 without departing from the disclosure and the previous are non-limiting examples.

Once the plurality of authorization messages 132 and/or historic authorization messages 136 are received by the processor 110 from external devices 140 and/or the historic data 124 stored in the memory 120, the processor 110 extracts predetermined data 138 from the authorization messages 132 and/or historic authorization messages 136 at operation 210. Depending on the type of action 142 to be authorized, different predetermined data 138 may be extracted from the authorization messages 132 and/or historic authorization messages 136 at operation 210. The predetermined data 138 may include at least identification and geolocation information associated with the one or more different actions 142. For example, if the action 142 is a point-of-sale transaction, the predetermined data 138 extracted from the related authorization messages 136 may be the amount, one or more account numbers, the geolocation of the external device 140, IP addresses for the external device 140, and/or other information that may be useful for determining if the action 142 should be authorized. In a second example if the action 142 is dispensing a product, for example food, beverage, a drug, a consumer device, office supply, or any other product, the processor 110 would extract from the corresponding authorized message 132, predetermined data 138 such as, in a non-limiting example, a user's 144 identification, an amount of product, the amount of the purchase, the geolocation of the external device 140, and any other pertinent information.

Other predetermined data 138, related to the network 130 or the external device 140, may also be extracted from the authorization messages 132 and/or historic authorization messages 136. This predetermined data 138 may include such things as symbol rate, channel load, loss, span count, length of the message, channel noise, channel grid, hash value of the message, protocols used, routing, and any other data that might indicate that the message has been tampered with or being transmitted from unauthorized external devices 140.

Once the predetermined data 138 is extracted in operation 210, the processor 110 retrieves a neural network algorithm 112 from the memory 120. The processor 110 in operation 215 then uses the neural network algorithm 112 to group the plurality of authorization messages 132 and/or historic authorization messages 136 in a plurality of message groupings 150 based on determined common features from the extracted predetermined data 138. The neural network algorithm 112 may have been previously trained or may be trained using the historic authorization messages 136. The neural network algorithm 112 may take a variety of known forms such as feedforward neural network, autoencoder, probabilistic neural network (PNN), convolutional neural network (CNN), or other known neural network algorithms 112. The specific type of neural network algorithm 112 used by the processor 110 being selected based on a variety of factors, including computational ability of the processor 110, speed of the neural network algorithm 112, availably of sufficient training data for the specific neural network algorithm 112, appropriateness to the type of authorization messages 132, and/or other criteria.

The neural network algorithm 112 may be trained using supervised learning with historic authorization messages 132, and/or, at least initially, with training sets produced by other means. Table 1 shows an example subset of training data that might be used to train a neural network algorithm 112 for use when the external devices 140 are point of sale (POS) devices accepting a credit or debit card in accordance with the present disclosure.

TABLE 1

```
Set 1
{
  Card_type:"VISA"
  Card number:"4242424242424242"
  Card_exp.: "6/26"
  Cvv: "123"
{
    Store Meta Data
      {
        Store_id:"SD_123"
        Store_Meta_data:"1-2-4-5"y
      }
      Infographic
      {
        Latitude:"44.968046"
        logitude:"-94.420307"
        Hash_value:"HAT-0"
       Mode_Txn:"POS"
      }
          }

Set 2
{
  Card_type:"VISA"
  Card number:"4242424242424242"
  Card_exp.: "6/26"
  Cvv: "123"
{
    Store Meta Data
      {
        Store_id:"SD_123"
        Store_Meta_data:"1-2-4-6y"
      }
      Infographic
      {
        Latitude:"44.968047"
        logitude:"-94.420307"
        Hash_value:"HAT-0"
       Mode_Txn:"POS"
      }
          }

Set 3
{
  Card_type:"VISA"
  Card number:"4242424242424242"
  Card_exp.: "6/26"
  Cvv: "123"
{
    Store Meta Data
      {
        Store_id:"SD_123"
        Store_Meta_data:"1-2-4-6y1"
      }
      Infographic
      {
        Latitude:"44.968047"
        logitude:"-94.420307"
        Hash_value:"HAT-0"
       Mode_Txn:"POS"
      }
          }

Set 4
{
  Card_type:"MDS"
  Card number:"4000056655665556"
  Card_exp.: "3/26"
  Cvv: "123"
{
    Store Meta Data
      {
        Store_id:"SD_1234"
        Store_Meta_data:"1-22-4-6y"
      }
      Infographic
      {
        Latitude:"32.968047"
        logitude:"-95.420307"
        Hash_value:"HAT-2"
       Mode_Txn:"POS"
      }
          }

Set 5
{
  Card_type:"OTHER"
  Card number:"2223003122003222"
  Card_exp.: "4/26"
  Cvv: "123"
{
    Store Meta Data
      {
        Store_id:"SD_12354"
        Store_Meta_data:"1-22-45-6y"
      }
      Infographic
      {
        Latitude:"31.968547"
        logitude:"-45.420307"
        Hash_value:"HAT-1"
       Mode_Txn:"POS"
      }
          }

Set 6
{
  Card_type:"VISA"
  Card number:"4242424242424242"
  Card_exp.: "6/26"
  Cvv: "123"
{
    Store Meta Data
      {
        Store_id:"SD_123"
        Store_Meta_data:"1-2-4-5"y
      }
      Infographic
      {
        Latitude:"44.968046"
        logitude:"-94.420307"
        Hash_value:"HAT-1"
       Mode_Txn:"POS"
      }
          }

Set 7
{
  Card_type:"VISA"
  Card number:"4242424242424242"
  Card_exp.: "6/26"
  Cvv: "123"
{
    Store Meta Data
      {
        Store_id:"SD_123"
        Store_Meta_data:"1-2-4-6y"
      }
      Infographic
      {

Set 8
{
  Card_type:"VISA"
  Card number:"4242424242424242"
  Card_exp.: "6/26"
  Cvv: "123"
{
    Store Meta Data
      {
        Store_id:"SD_123"
        Store_Meta_data:"1-2-4-6y1"
      }
      Infographic
      {
```

TABLE 1-continued

| | |
|---|---|
| Latitude:"44.968047"<br>logitude:"−94.420307"<br>Hash_value:"HAT-0"<br>Mode_Txn:"POS"<br>}<br>}<br>Set 9<br>{<br>Card_type:"MDS"<br>Card number:"4000056655665556"<br>Card_exp.: "3/26"<br>Cvv: "123"<br>{<br>Store Meta Data<br>{<br>Store_id:"SD_1234"<br>Store_Meta_data:"1-22-4-6y"<br>}<br>Infographic<br>{<br>Latitude:"32.968047"<br>logitude:"−95.420307"<br>Hash_value:"HAT-2"<br>Mode_Txn:"POS"<br>}<br>} | Latitude:"44.968047"<br>logitude:"−94.420307"<br>Hash_value:"HAT-0"<br>Mode_Txn:"POS"<br>}<br>}<br>Set 10<br>{<br>Card_type:"OTHER"<br>Card number:"2223003122003222"<br>Card_exp.: "4/26"<br>Cvv: "123"<br>{<br>Store Meta Data<br>{<br>Store_id:"SD_12354"<br>Store_Meta_data:"1-22-45-6y"<br>}<br>Infographic<br>{<br>Latitude:"31.968547"<br>logitude:"−45.420307"<br>Hash_value:"HAT-1"<br>Mode_Txn:"POS"<br>}<br>} |

While table 1 shows ten training data sets, in general, the neural network algorithm 112 may be trained with many more training data sets that may number into the hundreds, thousands, or more. The training data sets may include more or less data then shown and the training data may be different for different types of actions 142. Table 1 is exemplary, and the disclosure is not limited to the training data shown in Table 1.

Once the neural network algorithm 112 is trained, the processor 110 uses the trained neural network algorithm 112 to group the authorization messages 132 and historical authorization messages 136 into a plurality of message groupings 150. These message grouping 150 are determined based on patterns of common features identified by the neural network algorithm 112. Such message groupings 150 might be based on such things as where the action 142 or external devices 140 related to the authorization messages 132 is geolocated using data gathered by common geolocation techniques and/or using IP addresses or other means. Another exemplary message grouping 150 may be based on such things as a numerical amount associated with the plurality of authorization messages 132, such as but not limited to, an amount of money associated with the action 142 or frequency of receiving identical or similar authorization messages 132. Yet another exemplary message groupings 150 may be based on the time of day when the authorization messages 132 and historic authorization messages 136 were sent. As another example, using the exemplary ten sets of training data above as an example, one grouping may be sets 1, 2, 3, 6, 7, 8 which are associated with VISA. Another grouping may be sets 1, 2, 3, 6, 7, 8 as they are from the same store with ID 123. Yet another grouping may be sets 4, 5, 9, and 10 as they have similar latitudes. The above are only examples and not meant to limit the disclosure in any way.

The message groupings 150 may be based on any other criteria and/or combinations of the above criteria that is determined by the processor 110 performing a neural network algorithm 112 in operation 215, and the message groups 150 may be combined with other message groupings 150 based on determinations by the processor 110 performing the neural network algorithm 112. Once the plurality of message groupings 150 are prepared by the processor 110 in operation 215, the processor 110 uses a long-short-term-memory (LSTM) algorithm 114 in operation 220 to determine the probability of the message groupings 150 may be associated with an unauthorized action 142. An LSTM algorithm 114 is a recurrent neural network, which aims to provide a short-term memory for recurrent neural networks that may last thousands of timesteps. LSTM algorithms 114 are applicable to classification, processing, and predicting data based on time series. The LSTM algorithm 114 includes an additional module in a neural network that learns when to remember and when to forget pertinent information; learning which information might be needed later in a sequence and when that information is no longer needed.

Returning to the present disclosure, the processor 110 performing the LSTM algorithm 114 in operation 220 determines a plurality of patterns 128 that indicate that authorization messages 132 corresponding to one or more of the patterns 128 have a high probability of meeting a predetermine criteria indicating that the authorization messages 132 should not be authorized by the processor 110. For example, in a non-limiting example, if an authorization message 132 comes from an external device 140 that is located in the United States of America, but the authorization message 132 is routed through North Korea, the processor 110 may determine that this has a high probability of having been tampered with and should not be authorized by the processor 110.

Based on the resulting probabilities the processor 110 performing the LSTM algorithm 114 may determine a plurality of patterns 128 that indicate that an authorization message 132 having predetermined data 138 that corresponding to a particular pattern of the at least one of the plurality of patterns 128 has a high probability of being associated with a particular action 142 that is unauthorized or potentially fraudulent. Using the previous example, the authorization messages 132 that have been routed through North Korea would be a pattern that has a high probability to be fraudulent and therefor actions 142 associated with that pattern should not be authorized. The plurality of patterns 128 determined by the processor 110 performing the LSTM algorithm 114 are then stored in the memory 120 for use when new authorization messages 132 are received.

Either after a period of time or immediately after the performance of operation 220, the processor 110 receives a new authorization message 132 from the external devices 140 in operation 225. These new authorization messages 132 are produced by the external devices 140 when a user 144 requests an action 142 to be performed. Alternatively, or in addition, authorization messages 132 may be generated by the external devices 140 when one or more processes initiate an action 142 without user 144 input.

Once the new authorization messages 132 are received by the processor 110 in operation 225, the processor 110 applies a multi dependency data processes scheduling (MDDPS) 116 algorithm to the incoming authorization messages 132 in operation 230. The MDDPS algorithm 116 analyzes the order that the authorization messages 132 are received as well as other predetermined criteria to determine the order that the authorization messages 132 are to be evaluated by the processor 110. For example, in a non-limiting example, authorization messages 132 related to a purchase of a $1000 dollars or more may be evaluated prior to those related to under $1000. If the authorization messages 132 are for dispensing a product, authorization messages 132 related to a lifesaving drug may be processed prior to those related to non-essential products such as candy. The specific predetermined criteria may be set by a user 144, administrator, manager, executive, governmental entity, or any other concerned party and are not limited to the above examples, and the MDDPS algorithm 116 is able to determine an order of a plurality of authorization messages 132 and based on more than one predetermined criterion.

Once the processor 110 performing the MDDPS algorithm 116 in operation 230 determines the order of the new authorization messages 132 and determines which of the new authorization messages 132 is the next authorization message 152, the next authorization message 152 is evaluated by the processor 110 in operation 235. The processor 110, performs a comparison operation 154 between the next authorization messages 152 and the plurality of patterns 128 that were generated in operation 220. At this time, the processor 110 may perform other processes to determine if the next authorization message 152 should be authorized. For example, other processes may include determining if a user's 144 account has sufficient funds or if a product related to the action 142 is available.

If the processor 110 determines when performing the comparison operation 154 that the next authorization message 152 does not correspond to any of the plurality of patterns 128 in step 240, the method proceeds to operation 245 where a notification 134 is sent to the external devices 140 authorizing the action 142 related to the next authorization message 152.

However, if in step 240 the processor 110 determines when performing the comparison operation 154 that the next authorization message 152 corresponds to at least one of the plurality of patterns 128, the method proceeds to operation 250. In operation 250 the processor 110 sends a notification 134 to the external devices 140 instructing the external device 140 to deny the action 142. Alternatively, or in addition, the processor 110 sends a notification to the user 144, other external devices 140, and/or other concerned parties indicating that the next authorization message 152 was related to an action 142 that should not be authorized, such as a fraudulent action 142. This may allow the user 144 such as a customer, a government entity, security official, or appropriate other entity to perform appropriate activities to prevent further unauthorized actions 142 from being performed.

Once the processor 110 performs either operation 245 or operation 250, the method proceeds to operation 255 when the trained neural network algorithm 112 and/or LSTM algorithm 114 are updated with the predetermined data 138 extracted from the new authorization message 132. This may be done in the same manner or in a similar manner to that discussed in operations 205-220. Alternatively, operation 255 may take a different form or may not be performed.

Once operation 255 is completed the processor 110 determines if the next authorization message 152 is the last message in operation 260. If it is not operations 230-260 are repeated until the last new authorization message 132 is processed in steps 230-260. After operation 260 the method 200 may end, until a new authorization message 132 is received by the processor 110.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 140(f) as it exists on the date of filing hereof unless the words "means for" or "operation for" are explicitly used in the particular claim.

The invention claimed is:

1. A system for authorizing an action, the system comprising:
- a memory configured to store instructions and data related to authorizing the action; and
- a processor operably coupled to the memory and configured to:
  - receive a plurality of authorization messages, wherein each of the plurality of authorization messages is a request for authorizing one or more different actions;
  - extract predetermined data from each of the plurality of authorization messages, wherein the predetermined data includes at least identification and geolocation information associated with the one or more different actions;
  - retrieve a convolutional neural network algorithm stored in the memory, wherein the convolutional neural network algorithm is previously trained using historic authorization messages and wherein the historic authorization messages are associated with an external device receiving permission to perform one or more different actions;

group, by the convolutional neural network algorithm, the plurality of authorization messages based on determined common features from the extracted predetermined data, to produce a plurality of message groupings;

determine from the plurality of message groupings, by a long-short-term-memory algorithm (LSTM), a plurality of location-based patterns that indicate that a particular authorization message meets a predetermined criteria, wherein the predetermined criteria indicates that a particular action associated with the particular authorization message should not be authorized;

receive a first new authorization message and a second new authorization message from the external device, wherein the first new authorization message comprises a first action and the second new authorization message comprises a second action and wherein the first action is to access the external device and the second action is to access a secure document;

execute a multi dependency data processing scheduling (MDDPS) algorithm to each of the first new authorization message and the second new authorization message, wherein executing the MDDPS algorithm determines an order that each of the first new authorization message and the second new authorization message is compared to the plurality of location-based patterns based on one or more predetermined criteria, and wherein:

the one or more predetermined criteria utilized by the MDDPS algorithm to determine the order comprises at least a first data value associated with the first new authorization message and a second data value associated with the second new authorization message; and the first new authorization message is compared to the plurality of location-based patterns before the second new authorization message is compared to the plurality of location-based patterns;

compare the first new authorization message to the plurality of location-based patterns;

transmit a first notification to the external device to deny the first action associated with the first new authorization message when the first new authorization message corresponds to at least one of the plurality of location-based patterns, wherein the first notification indicates that the first action is a fraudulent action;

compare the second new authorization message to the plurality of location-based patterns; and transmit a second notification to the external device to allow access to the secure document when the second new authorization message does not correspond to at least one of the plurality of location-based patterns;

transmit a third notification to the external device to deny access to the secure document when the second new authorization message corresponds to at least one of the plurality of location-based patterns; and in response to transmitting the third notification to the external device, update the convolutional neural network algorithm and the LSTM algorithm using the first new authorization message and the second new authorization message.

2. The system of claim 1, wherein the first data value is greater than a threshold data value and the second data value is less than the threshold data value.

3. The system of claim 1, wherein each of the plurality of authorization messages are sent from the external device and each of the plurality of authorization messages are related to receiving permission for the external device to perform an action.

4. The system of claim 1, wherein the LSTM algorithm determines a probability that a particular pattern is associated with an unauthorized action and the predetermined criteria is that the probability that the particular pattern is associated with an unauthorized action is greater than a threshold percentage.

5. The system of claim 1, wherein the plurality of authorization messages are grouped by the convolutional neural network algorithm at least based on where the external device is located.

6. The system of claim 1, wherein the plurality of authorization messages are grouped by the convolutional neural network algorithm at least based on a numerical amount associated with each of the plurality of authorization messages.

7. The system of claim 1, wherein the processor is further configured to update the convolutional neural network algorithm and the LSTM algorithm using the first new authorization message and the second new authorization message.

8. A method for authorizing an action, comprising:

receiving a plurality of authorization messages, wherein each of the plurality of authorization messages is a request for authorizing one or more different actions;

extracting predetermined data from each of the plurality of authorization messages, wherein the predetermined data includes at least identification and geolocation information associated with the one or more different actions;

retrieving a convolutional neural network algorithm stored in a memory, wherein the convolutional neural network algorithm is previously trained using historic authorization messages and wherein the historic authorization messages are associated with an external device receiving permission to perform one or more different actions;

grouping, by the convolutional neural network algorithm, the plurality of authorization messages based on determined common features from the extracted predetermined data, to produce a plurality of message groupings;

determining from the plurality of message groupings, by a long-short-term-memory algorithm (LSTM), a plurality of location-based patterns that indicate that a particular authorization message meets a predetermined criteria, wherein the predetermined criteria indicates that a particular action associated with the particular authorization message should not be authorized;

receiving a first new authorization message and a second new authorization message from the external device, wherein the first new authorization message comprises a first action and the second new authorization message comprises a second action and wherein the first action is to access the external device and the second action is to access a secure document;

executing a multi dependency data processing scheduling (MDDPS) algorithm to each of the first new authorization message and the second new authorization message, wherein executing the MDDPS algorithm determines an order that each of the first new authorization message and the second new authorization message is compared to the plurality of location-based patterns based on one or more predetermined criteria, and wherein:

the one or more predetermined criteria utilized by the MDDPS algorithm to determine the order comprises at least a first data value associated with the first new authorization message and a second data value associated with the second new authorization message; and the first new authorization message is compared to the plurality of location-based patterns before the second new authorization message is compared to the plurality of location-based patterns;

comparing the first new authorization message to the plurality of location-based patterns;

transmitting a first notification to the external device to deny the first action associated with the first new authorization message when the first new authorization message corresponds to at least one of the plurality of location-based patterns, wherein the first notification indicates that the first action is a fraudulent action;

comparing the second new authorization message to the plurality of location-based patterns; and transmitting a second notification to the external device to allow access to the secure document when the second new authorization message does not correspond to at least one of the plurality of location-based patterns;

transmit a third notification to the external device to deny access to the secure document when the second new authorization message corresponds to at least one of the plurality of location-based patterns; and in response to transmitting the third notification to the external device, update the convolutional neural network algorithm and the LSTM algorithm using the first new authorization message and the second new authorization message.

9. The method of claim 8, wherein the first data value is greater than a threshold data value and the second data value is less than the threshold data value.

10. The method of claim 8, wherein each of the plurality of authorization messages are sent from the external device and each of the plurality of authorization messages are related to receiving permission for the external device to perform an action.

11. The method of claim 8, wherein the LSTM algorithm determines a probability that a particular pattern is associated with an unauthorized action and the predetermined criteria is that the probability that the particular pattern is associated with an unauthorized action is greater than a threshold percentage.

12. The method of claim 8, wherein the plurality of authorization messages are grouped by the convolutional neural network algorithm at least based on where the external device is located.

13. The method of claim 8, wherein the plurality of authorization messages are grouped by the convolutional neural network algorithm at least based on a numerical amount associated with each of the plurality of authorization messages.

14. The method of claim 8, further comprising:

updating the convolutional neural network algorithm and the LSTM algorithm using the first new authorization message and the second new authorization message.

15. A non-transitory computer-readable medium storing instructions that when executed by a processor cause the processor to:

receive a plurality of authorization messages, wherein each of the plurality of authorization messages is a request for authorizing one or more different actions;

extract predetermined data from each of the plurality of authorization messages, wherein the predetermined data includes at least identification and geolocation information associated with the one or more different actions;

retrieve a convolutional neural network algorithm stored in a memory, wherein the convolutional neural network algorithm is previously trained using historic authorization messages and wherein the historic authorization messages are associated with an external device receiving permission to perform one or more different actions;

group, by the convolutional neural network algorithm, the plurality of authorization messages based on determined common features from the extracted predetermined data, to produce a plurality of message groupings;

determine from the plurality of message groupings, by a long-short-term-memory algorithm (LSTM), a plurality of location-based patterns that indicate that a particular authorization message meets a predetermined criteria, wherein the predetermined criteria indicates that a particular action associated with the particular authorization message should not be authorized;

receive a first new authorization message and a second new authorization message from the external device, wherein the first new authorization message comprises a first action and the second new authorization message comprises a second action and wherein the first action is to access the external device and the second action is to access a secure document;

execute a multi dependency data processing scheduling (MDDPS) algorithm to each of the first new authorization message and the second new authorization message, wherein executing the MDDPS algorithm determines an order that each of the first new authorization message and the second new authorization message is compared to the plurality of location-based patterns based on one or predetermined criteria, and wherein:

the one or more predetermined criteria utilized by the MDDPS algorithm to determine the order comprises at least a first data value associated with the first new authorization message and a second data value associated with the second new authorization message; and the first new authorization message is compared to the plurality of location-based patterns before the second new authorization message is compared to the plurality of location-based patterns;

compare the first new authorization message to the plurality of location-based patterns;

transmit a first notification to the external device to deny the first action associated with the first new authorization message when the first new authorization message corresponds to at least one of the plurality of location-based patterns, wherein the first notification indicates that the first action is a fraudulent action;

compare the second new authorization message to the plurality of location-based patterns; and transmit a second notification to the external device to allow access to the secure document when the second new authorization message does not correspond to at least one of the plurality of location-based patterns;

transmit a third notification to the external device to deny access to the secure document when the second new authorization message corresponds to at least one of the plurality of location-based patterns; and in response to transmitting the third notification to the external device, update the convolutional neural network algorithm and the LSTM algorithm using the first new authorization message and the second new authorization message.

16. The non-transitory computer-readable medium of claim 15, wherein the first data value is greater than a threshold data value and the second data value is less than the threshold data value.

17. The non-transitory computer-readable medium of claim 15, wherein each of the plurality of authorization messages are sent from the external device and each of the plurality of authorization messages are related to receiving permission for the external device to perform an action.

18. The non-transitory computer-readable medium of claim 15, wherein the LSTM algorithm determines a probability that a particular pattern is associated with an unauthorized action and the predetermined criteria is that the probability that the particular pattern is associated with an unauthorized action is greater than a threshold percentage.

19. The non-transitory computer-readable medium of claim 15, wherein the plurality of authorization messages are grouped by the convolutional neural network algorithm at least based on where the external device is located.

20. The non-transitory computer-readable medium of claim 15, wherein the plurality of authorization messages are grouped by the convolutional neural network algorithm at least based on a numerical amount associated with each of the plurality of authorization messages.

* * * * *